US012766762B2

(12) United States Patent
Lin et al.

(10) Patent No.: US 12,766,762 B2
(45) Date of Patent: Oct. 20, 2026

(54) SEPARATION APPARATUS AND METHOD FOR SEPARATING PLASTIC AND SILICONE IN A COMPOSITE MATERIAL

(71) Applicants: Taiwan Green Point Enterprises Co., Ltd., Taichung City (TW); Jabil Circuit (Singapore) Pte. Ltd., Singapore (SG)

(72) Inventors: Bing-Yuan Lin, Taichung City (TW); Ying-Yin Chen, Taichung City (TW); Yung-Chih Chen, Taichung City (TW); Ching-Hsin Chen, Taichung City (TW)

(73) Assignees: Taiwan Green Point Enterprises Co., Ltd., Taichung City (TW); Jabil Circuit (Singapore) Pte. Ltd., Singapore (SG)

( * ) Notice: Subject to any disclaimer, the term of this patent is extended or adjusted under 35 U.S.C. 154(b) by 527 days.

(21) Appl. No.: 18/469,925

(22) Filed: Sep. 19, 2023

(65) Prior Publication Data

US 2024/0100743 A1 Mar. 28, 2024

(30) Foreign Application Priority Data

Sep. 23, 2022 (TW) ................................ 111210410

(51) Int. Cl.

*B29B 17/02* (2006.01)
*B29K 69/00* (2006.01)
*B29K 83/00* (2006.01)

(52) U.S. Cl.

CPC ...... *B29B 17/02* (2013.01); *B29B 2017/0203* (2013.01); *B29B 2017/0234* (2013.01); *B29B 2017/0289* (2013.01); *B29B 2017/0293* (2013.01); *B29K 2069/00* (2013.01); *B29K 2083/00* (2013.01)

(58) Field of Classification Search

CPC ........... B29B 17/02; B29B 2017/0244; B29B 2017/0289; B29B 2017/0234; B29B 2017/0203; B29B 2017/0293; B29K 2083/005; B29K 2083/00; B29K 2069/00; Y02W 30/62

See application file for complete search history.

(56) References Cited

FOREIGN PATENT DOCUMENTS

| | | | | |
|---|---|---|---|---|
| CN | 106554862 A | 4/2017 | | |
| CN | 111171966 A | 5/2020 | | |
| WO | WO-2008043764 A1 * | 4/2008 | ............. | B29B 17/02 |

OTHER PUBLICATIONS

Translation of WO 2008/043764 (Year: 2008).*

* cited by examiner

*Primary Examiner* — Monica A Huson

(74) *Attorney, Agent, or Firm* — Young Basile Hanlon & MacFarlane, P.C.

(57) ABSTRACT

A separation apparatus suitable for separating plastic and silicone in a composite material includes a storage tank configured to store a hydrocarbon solvent, and a reaction tank fluidly connected to the storage tank and having a reaction space for placement of the composite material therein and for receiving the hydrocarbon solvent from the storage tank such that the composite material is immersed in the hydrocarbon solvent for separating the plastic and the silicone in the composite material. The plastic and the silicone in the composite material are insoluble in the hydrocarbon solvent.

18 Claims, 3 Drawing Sheets

SEPARATION APPARATUS AND METHOD FOR SEPARATING PLASTIC AND SILICONE IN A COMPOSITE MATERIAL

CROSS-REFERENCE TO RELATED APPLICATION

This application claims priority to Taiwanese Utility Model Patent Application No. 111210410, filed on Sep. 23, 2022.

FIELD

The disclosure relates to a separation apparatus, and more particularly to a separation apparatus and a method for separating plastic and silicone in a composite material.

BACKGROUND

Polycarbonate (PC) and liquid silicone rubber (LSR) composite material has been widely used in fields, such as automotive components, electronics industry, medical treatment, and sports equipment. However, when these products are phased out and recycled, disposal of the composite material becomes a challenge.

An existing way to separate the plastic (polycarbonate) and the silicone (liquid silicone rubber) in the above-mentioned composite material is, generally, to dissolve the silicone. However, the solvent used to dissolve the silicone cannot be recycled, leading to the problem of waste liquid treatment.

SUMMARY

Therefore, an object of the present disclosure is to provide a separation apparatus that can alleviate at least one of the drawbacks of the prior art.

According to one aspect of this disclosure, the separation apparatus is suitable for separating plastic and silicone in a composite material, and includes a storage tank configured to store a hydrocarbon solvent, and a reaction tank fluidly connected to the storage tank. The reaction tank has a reaction space for placement of the composite material therein and for receiving the hydrocarbon solvent from the storage tank such that the composite material is immersed in the hydrocarbon solvent for separating the plastic and the silicone in the composite material. The plastic and the silicone in the composite material are insoluble in the hydrocarbon solvent.

Another object of the present disclosure is to provide a method for separating plastic and silicone in a composite material that can alleviate at least one of the drawbacks of the prior art.

According to another aspect of this disclosure, the method for separating plastic and silicone in a composite material comprises the steps of: storing a hydrocarbon solvent in a storage tank and placing a composite material in a reaction space of a reaction tank, and delivering the hydrocarbon solvent from the storage tank to the reaction space of the reaction tank for immersing the composite material in the hydrocarbon solvent to thereby separate the plastic and the silicone in the composite material. The plastic and the silicone are insoluble in the hydrocarbon solvent.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
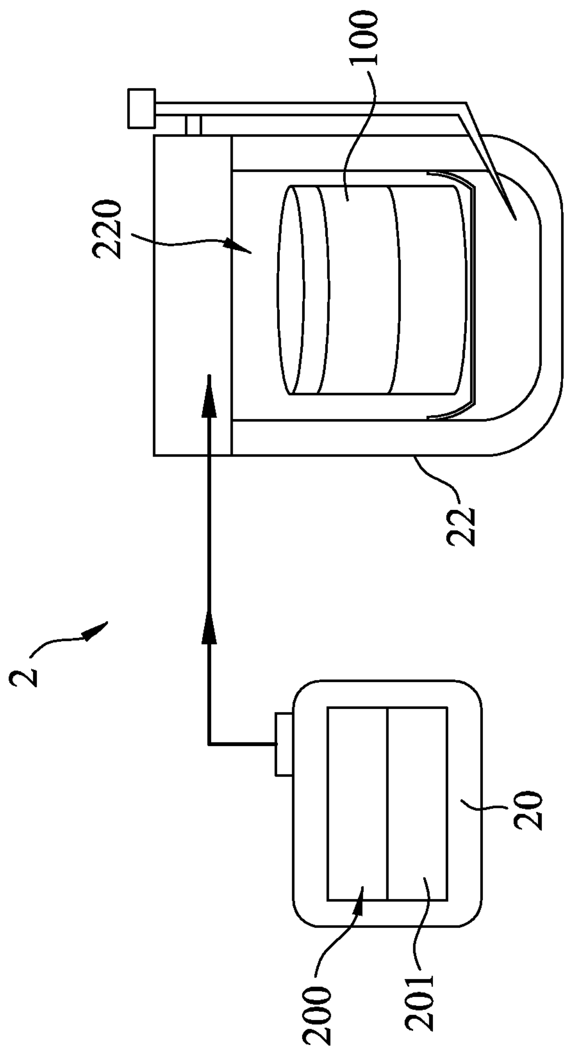
FIG. 1 is a perspective view of a separation apparatus according to the first embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a separation apparatus 2 according to the first embodiment of the present disclosure is suitable for separating plastic 101 (see FIG. 2) and silicone 102 (see FIG. 2) in a composite material 100, preferably for separating integrally bonded polycarbonate (PC) and liquid silicone rubber (LSR) in the composite material 100. The liquid silicone rubber can be self-bonding or non-self-bonding, can be added with surface treatment agent, or can have a paint layer.

The separation apparatus 2 of this embodiment includes a storage tank 20, and a reaction tank 22 fluidly connected to the storage tank 20. The storage tank 20 has a storage space 200 for storing a hydrocarbon solvent 201. In this embodiment, the hydrocarbon solvent 201 is selected from one of heptane, D40 dearomatized mineral spirit, D60 dearomatized mineral spirit, and D80 dearomatized mineral spirit.

The reaction tank 22 has a reaction space 220 for placement of the composite material 100 therein and for receiving the hydrocarbon solvent 201 from the storage tank 20. The hydrocarbon solvent 201 can be circulated back and forth between the storage space 200 and the reaction space 220 through a pump (not shown) and a pipeline (represented by solid arrows).

After the composite material 100 is placed in the reaction space 220, the hydrocarbon solvent 201 from the storage tank 20 is delivered to the reaction space 220 for immersing the composite material 100 therein to thereby separate the polycarbonate and the liquid silicone rubber in the composite material 100. The polycarbonate and the liquid silicone rubber in the composite material 100 are insoluble in the hydrocarbon solvent 201.

In this embodiment, the immersing of the composite material 100 in the hydrocarbon solvent 201 is carried out at room temperature (that is, without heating the hydrocarbon solvent 201). Therefore, the separation of the polycarbonate and the liquid silicone rubber takes a long time. When the polycarbonate and the liquid silicone rubber are still partially bonded during separation, the polycarbonate and the liquid silicone rubber can be torn apart from each other using a manual method. Thus, the polycarbonate and the liquid silicone rubber can be effectively separated from each other.

Figure 2:
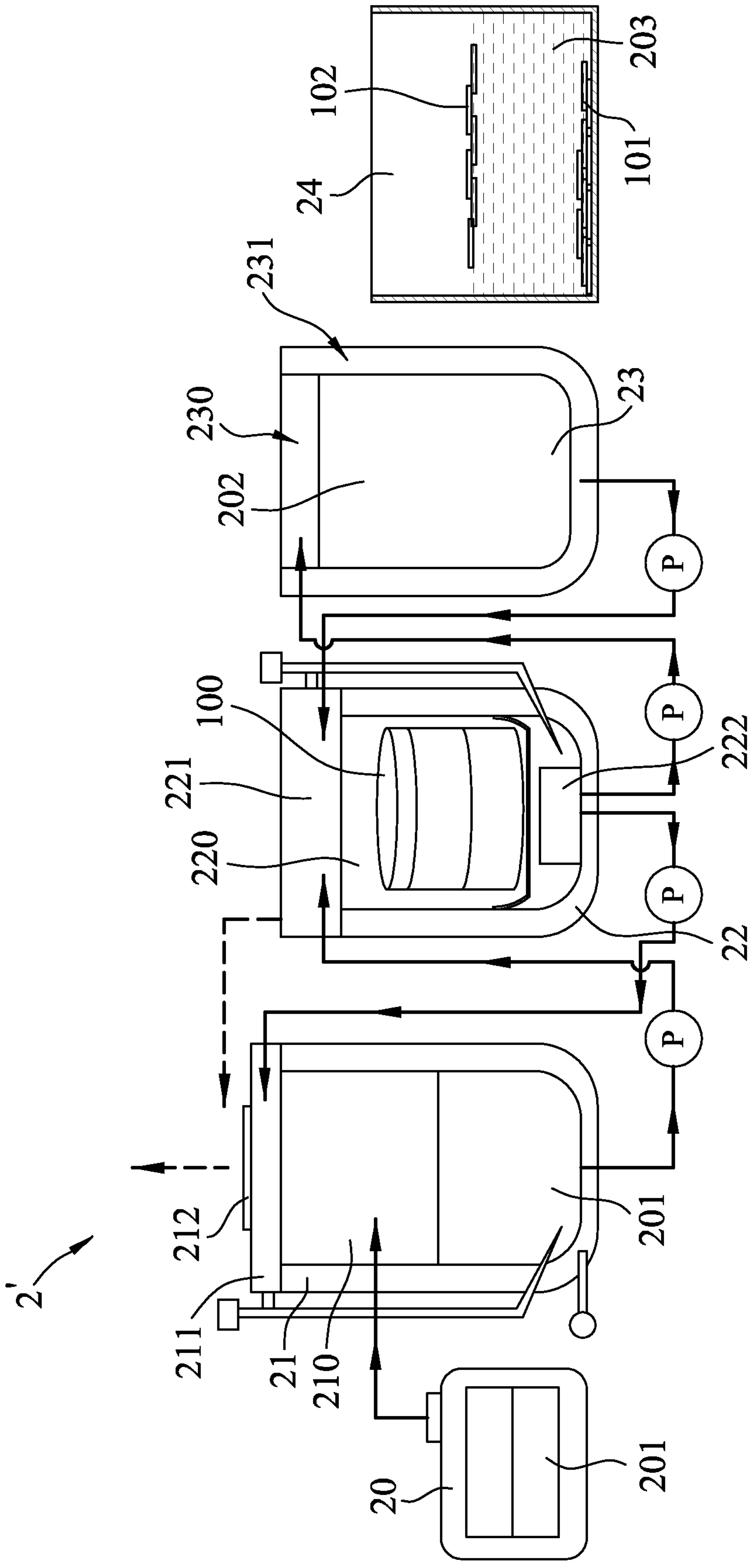
FIG. 2 is a perspective view of a separation apparatus according to the second embodiment of the present disclosure.

Referring to FIG. 2, the second embodiment of the separation apparatus 2' of this disclosure differs from the first embodiment in that, in the second embodiment, the separation apparatus 2' further comprises a heating tank 21, a cooling washing tank 23, and a screening tank 24.

The heating tank 21 is fluidly connected between the storage tank 20 and the reaction tank 22 through a plurality of pumps (P) and pipelines (represented by solid arrows), and has a heating space 210, a heating tank cover 211 covering and sealing the heating space 210, and a pressure valve 212 disposed on the heating tank cover 211 and communicating with the heating space 210. The reaction tank 22 further has a reaction tank cover 221 covering and sealing the reaction space 220, and an ultrasonic oscillator 222 disposed below the reaction space 220.

The cooling washing tank 23 is fluidly connected to the reaction tank 22 through a plurality of pumps (P) and pipelines (represented by solid arrows), and is used for storing a cooling washing liquid 202. To maintain the cooling washing liquid 202 at a low temperature, the cooling washing tank 23 can have a double-layer space structure. That is, the cooling washing tank 23 has a cooling liquid receiving space 230 for containing the cooling washing liquid 202, and an outer peripheral space 231 surrounding an outer peripheral surface of the cooling liquid receiving space 230. The outer peripheral space 231 is used for containing a liquid with low temperature, such as ice water, to maintain the cooling washing liquid 202 at the low temperature.

The screening tank 24 is used to contain a separation liquid 203 which has a specific gravity between specific gravities of the plastic 101 and the silicone 102. In this embodiment, the cooling washing liquid 202 and the separation liquid 203 are water.

To use the separation apparatus 2' for separating the polycarbonate (plastic 101) and the liquid silicone rubber (silicone 102) in the composite material 100, the hydrocarbon solvent 201 in the storage tank 20 is first delivered from the storage tank 20 to the heating tank 21 for heating, after which the heated hydrocarbon solvent 201 is delivered to the reaction tank 22 for immersing the composite material 100 therein to thereby produce a separation mixture in the reaction tank 22. Furthermore, a surface of the composite material 100 may also have other surface treatment agent, such as paint spray coating or other surface treatment agent, which can be effectively separated by immersing in the hydrocarbon solvent 201.

It is worth to mention herein that, when the composite material 100 reacts with the heated hydrocarbon solvent 201 in the reaction tank 22, a reactive gas, such as organic heat vapor, will be generated. Since the reaction tank 22 is provided with the reaction tank cover 221 that seals the reaction space 220, the reactive gas can be confined in the reaction space 220 without overflowing, so that an operator can operate in a safe environment.

Moreover, after reaction with the composite material 100, the hydrocarbon solvent 201 is sent from the reaction tank 22 back to the heating tank 21. Then, the cooling washing liquid 202 in the cooling washing tank 23 is delivered to the reaction tank 22 so as to effectively lower the temperature of the reaction tank 22 to room temperature and so as to clean the hydrocarbon solvent 201 remaining in the separation mixture through the assistance of the ultrasonic oscillator 222. It should be noted that a reactive gas generated by heating the hydrocarbon solvent 201 can be discharged through the pressure valve 212.

After cleaning the separation mixture, the cooling washing liquid 202 is sent back to the cooling washing tank 23, and is left to stand still therein, so that the hydrocarbon solvent 201 can be separated from the cooling washing liquid 202. The separated hydrocarbon solvent 201 is then sent back to the storage tank 20 for reuse, and the cooling washing liquid 202 can also be recycled. Therefore, in the separation apparatus 2' of this disclosure, there is no need for waste liquid and other related treatment.

The cleaned separation mixture is removed from the reaction tank 22, and is then placed in the separation liquid 203 in the screening tank 24 for separating the plastic 101 and the silicone 102 in the separation mixture. Since the specific gravity of the separation liquid 203 is between the specific gravities of the plastic 101 and the silicone 102, the plastic 101 and the silicone 102 in the separation mixture can be completely separated through the difference in the specific gravities, and then the separated plastic 101 and the silicone 102 are scooped out separately. The plastic obtained after separation can be re-pelletized and injected to produce new product.

Figure 3:
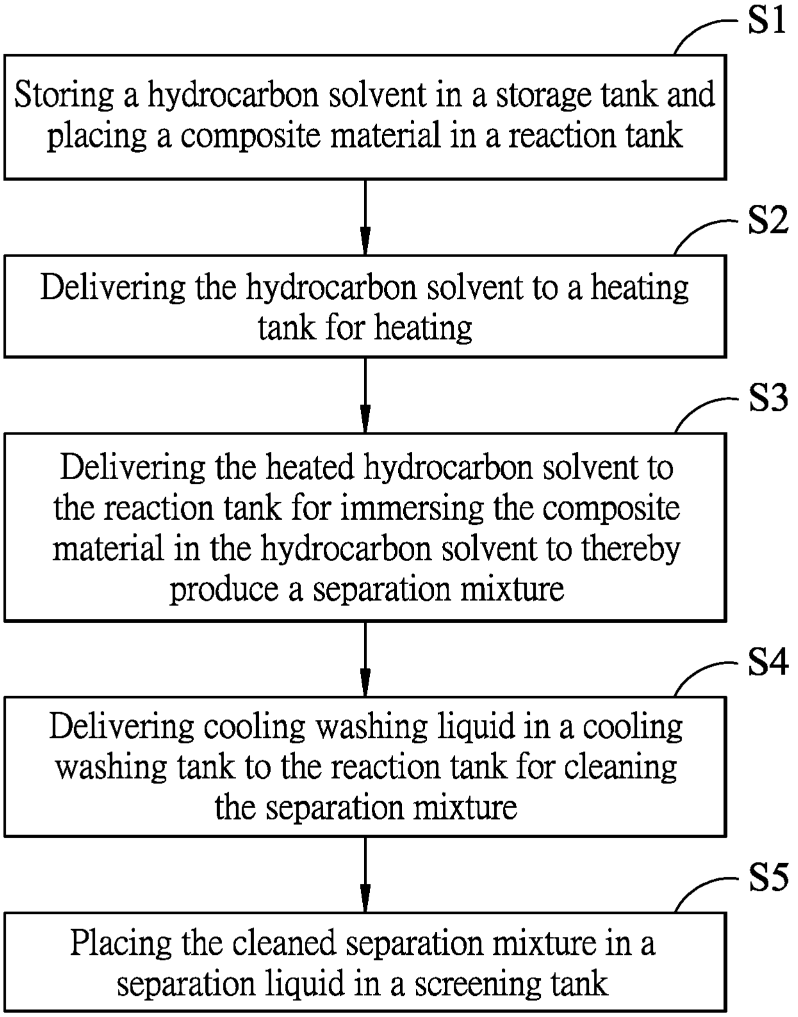
FIG. 3 is a flow chart, illustrating the steps involved in a method for separating a composite material according to an embodiment of the present disclosure.

Referring to FIG. 3, in combination with FIG. 2, a method for separating the composite material 100 using the separation apparatus 2' of this disclosure includes steps S1 to S5.

In step S1, the hydrocarbon solvent 201 is stored in the storage tank 20, and the composite material 100 is placed in the reaction space 220 of the reaction tank 22.

In step S2, the hydrocarbon solvent 201 from the storage tank 20 is delivered to the heating tank 21 for heating.

In step S3, the heated hydrocarbon solvent 201 is pumped from the storage tank 20 into the reaction space 220 for immersing the composite material 100 therein to thereby produce a separation mixture in the reaction tank 22.

In step S4, the cooling washing liquid 202 in the cooling washing tank 23 is delivered to the reaction tank 22 for cleaning and cooling the separation mixture.

In step S5, the cleaned separation mixture is removed from the reaction tank 22, and is then placed in the separation liquid 203 in the screening tank 24 for separating the plastic 101 and the silicone 102 in the separation mixture through the difference in the specific gravities.

In an embodiment, after cleaning the separation mixture, the cooling washing liquid 202 is sent back to the cooling washing tank 23, and is left to stand still therein, so that the hydrocarbon solvent 201 can be separated from the cooling washing liquid 202. The separated hydrocarbon solvent 201 is then sent back to the storage tank 20 for reuse, and the cooling washing liquid 202 can also be recycled.

In an embodiment, when the cooling washing liquid 202 enters the reaction tank 22, the separation mixture is cooled and cleaned by the cooling washing liquid 202 through the assistance of the ultrasonic oscillator 222 disposed below the reaction space 220.

In an embodiment, the reactive gas generated by heating the hydrocarbon solvent 201 can be discharged through the pressure valve 212.

In summary, in the separation apparatus 2, 2' of this disclosure, when the composite material 100 reacts with the hydrocarbon solvent 201, the reactive gas generated by the reaction can be confined in the reaction space 220 through the reaction tank cover 221 without overflowing, so that the operator can operate in a safe environment. Furthermore, the cooling washing liquid 202 in the cooling washing tank 23 can effectively lower the temperature of the reaction tank 22 to room temperature, and can clean the hydrocarbon solvent 201 remaining in the separation mixture through the assistance of the ultrasonic oscillator 222. Moreover, the cooling washing liquid 202 is sent back to the cooling washing tank 23 after cleaning the separation mixture, and is left to stand still in the cooling washing tank 23 to separate the hydrocarbon solvent 201 from the cooling washing liquid 202. The separated hydrocarbon solvent 201 and the cooling washing liquid 202 can both be recycled, so that there will be no problems related to waste liquid treatment. Therefore, the object of this disclosure can indeed be achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A separation apparatus suitable for separating plastic and silicone in a composite material, comprising:

a storage tank configured to store a hydrocarbon solvent;

a reaction tank fluidly connected to said storage tank and having a reaction space for placement of the composite material therein and for receiving said hydrocarbon solvent from said storage tank such that the composite material is immersed in said hydrocarbon solvent for separating the plastic and the silicone in the composite material, the plastic and the silicone in the composite material being insoluble in said hydrocarbon solvent; and a heating tank fluidly connected between the storage tank and the reaction tank, the hydrocarbon solvent from the storage tank being received and heated in the heating tank, the heated hydrocarbon solvent being delivered to the reaction tank for immersing the composite material in the heated hydrocarbon solvent to thereby produce a separation mixture.

2. The separation apparatus as claimed in claim 1, further comprising a cooling washing tank fluidly connected to said reaction tank and configured to store cooling washing liquid, said cooling washing liquid being delivered to said reaction tank to clean said separation mixture and being sent back to said cooling washing tank after cleaning said separation mixture.

3. The separation apparatus as claimed in claim 2, wherein, when said cooling washing liquid is left to stand still in said cooling washing tank, said hydrocarbon solvent is separated from said cooling washing liquid, and said separated hydrocarbon solvent is sent back to said storage tank.

4. The separation apparatus as claimed in claim 1, further comprising a screening tank that contains a separation liquid which has a specific gravity between specific gravities of the plastic and the silicone, said separation mixture being placed in said separation liquid in said screening tank for separating the plastic and the silicone through a difference in the specific gravities thereof.

5. The separation apparatus as claimed in claim 4, wherein said separation liquid is water.

6. The separation apparatus as claimed in claim 2, wherein said reaction tank further has an ultrasonic oscillator disposed below said reaction space and configured to assist in cleaning said separation mixture when said cooling washing liquid is in said reaction tank.

7. The separation apparatus as claimed in claim 1, wherein said reaction tank further has a reaction tank cover covering and sealing said reaction space, said reaction tank cover being configured to confine a reactive gas generated by the reaction of said hydrocarbon solvent and the composite material in said reaction space.

8. The separation apparatus as claimed in claim 1, wherein said heating tank has a heating space, a heating tank cover covering and sealing said heating space, and a pressure valve disposed on said heating tank cover and communicating with said heating space, and wherein a reactive gas generated by heating said hydrocarbon solvent in said heating tank is discharged through said pressure valve.

9. The separation apparatus as claimed in claim 1, wherein said hydrocarbon solvent is selected from one of heptane, D40 dearomatized mineral spirit, D60 dearomatized mineral spirit, and D80 dearomatized mineral spirit.

10. A method for separating plastic and silicone in a composite material, comprising:

storing a hydrocarbon solvent in a storage tank and placing a composite material in a reaction space of a reaction tank;

delivering the hydrocarbon solvent from the storage tank to the reaction space of the reaction tank for immersing the composite material in the hydrocarbon solvent to thereby separate the plastic and the silicone in the composite material, the plastic and the silicone being insoluble in the hydrocarbon solvent;

heating the hydrocarbon solvent before the hydrocarbon solvent is delivered to the reaction tank; and delivering the heated hydrocarbon solvent to the reaction space of the reaction tank for immersing the composite material in the hydrocarbon solvent to thereby produce a separation mixture in the reaction tank.

11. The method as claimed in claim 10, further comprising a step of delivering a cooling washing liquid stored in a cooling washing tank to the reaction tank for cleaning and cooling the separation mixture.

12. The method as claimed in claim 11, wherein the cooling washing liquid is sent back to the cooling washing tank after cleaning and cooling the separation mixture, and is left to stand still in the cooling washing tank for separating the hydrocarbon solvent from the cooling washing liquid, the separated hydrocarbon solvent being sent back from the cooling washing tank to the storage tank.

13. The method as claimed in claim 11, further comprising a step of placing the cleaned separation mixture in a separation liquid in a screening tank, the separation liquid having a specific gravity between specific gravities of the plastic and the silicone for separating the plastic and the silicone in the separation mixture through a difference in the specific gravities thereof.

14. The method as claimed in claim 13, wherein the separation liquid is water.

15. The method as claimed in claim 11, wherein, when the cooling washing liquid enters the reaction tank, the separation mixture is cooled and cleaned by the cooling washing liquid through an assistance of an ultrasonic oscillator disposed below the reaction space.

16. The method as claimed in claim 10, wherein a reactive gas generated by heating the hydrocarbon solvent is discharged through a pressure valve.

17. The method as claimed in claim 10, wherein the hydrocarbon solvent is selected from one of heptane, D40 dearomatized mineral spirit, D60 dearomatized mineral spirit, and D80 dearomatized mineral spirit.

18. A separation apparatus suitable for separating plastic and silicone in a composite material, comprising:

a storage tank configured to store a hydrocarbon solvent; and a reaction tank fluidly connected to the storage tank and having a reaction space for placement of the composite material therein and for receiving the hydrocarbon solvent from the storage tank such that the composite material is immersed in the hydrocarbon solvent for separating the plastic and the silicone in the composite material, the plastic and the silicone in the composite material being insoluble in the hydrocarbon solvent, wherein the reaction tank further has a reaction tank cover covering and sealing the reaction space, the reaction tank cover being configured to confine a reactive gas generated by the reaction of the hydrocarbon solvent and the composite material in the reaction space.

* * * * *